(12) United States Patent
Choe et al.

(10) Patent No.: US 10,438,467 B2
(45) Date of Patent: Oct. 8, 2019

(54) PORTABLE OBJECT DETECTION SYSTEMS AND METHODS FOR MUTUAL MONITORING BASED ON COOPERATION IN A NETWORK INCLUDING DEVICES WITH ASYMMETRIC AND CONSTRAINED POWER CAPACITIES

(71) Applicants: Myongsu Choe, Ontario (CA); Seyoung Choe, Ontario (CA)

(72) Inventors: Myongsu Choe, Ontario (CA); Seyoung Choe, Ontario (CA)

(73) Assignees: Myongsu Choe, Ontario (CA); Seyoung Choe, Ontario (CA)

( * ) Notice: Subject to any disclaimer, the term of this patent is extended or adjusted under 35 U.S.C. 154(b) by 0 days.

(21) Appl. No.: 15/626,427

(22) Filed: Jun. 19, 2017

(65) Prior Publication Data
US 2017/0372576 A1 Dec. 28, 2017

(30) Foreign Application Priority Data
Jun. 21, 2016 (KR) .................. 10-2016-0077243

(51) Int. Cl.
*G08B 13/24* (2006.01)
*G08B 21/24* (2006.01)
(Continued)

(52) U.S. Cl.
CPC ............. *G08B 13/24* (2013.01); *G08B 21/24* (2013.01); *H04W 4/21* (2018.02);
(Continued)

(58) Field of Classification Search
CPC ....... G08B 13/24; G08B 21/24; H04W 4/206; H04W 52/0212; H04W 52/18
See application file for complete search history.

(56) References Cited

U.S. PATENT DOCUMENTS

| | | | |
|---|---|---|---|
| 8,343,236 B2 | 1/2013 | Jia | 726/35 |
| 8,634,808 B1 | 1/2014 | Zhong et al. | 455/411 |

(Continued)

FOREIGN PATENT DOCUMENTS

| | | | | |
|---|---|---|---|---|
| KR | 2013-0138409 | 12/2013 | | G08B 21/24 |
| KR | 2015-0008804 | 1/2015 | | G08B 21/24 |
| KR | 2016-0038478 | 4/2016 | | G08B 21/24 |

*Primary Examiner* — Qun Shen
(74) *Attorney, Agent, or Firm* — Harness, Dickey & Pierce, P.L.C.

(57) ABSTRACT

This disclosure provides a portable object detection system and method. The system includes a first cluster network, a family cluster network, and a detection server. The first cluster network includes a portable object coupled with a small communication device (SCD), a first cluster head device (first CHD) including a smartphone that registers the SCD prior to monitoring, and performs mutual monitoring between the SCD and the first CHD. The detection server manages the first CHD and a second CHD, and when the detection server receives a loss event from the first CHD in the first cluster network, it requests a mutual search by the second CHD for the SCD as a lost target in the first cluster network.
The mutual monitoring in a first cluster network adjusts a message transmission interval and a radio transmission power depending on collected parameters such as the SCD's location information, mobility, power capacity, and others.

7 Claims, 12 Drawing Sheets

(51) Int. Cl.
*H04W 52/18* (2009.01)
*H04W 52/02* (2009.01)
*H04W 4/21* (2018.01)
*H04W 52/54* (2009.01)

(52) U.S. Cl.
CPC ....... *H04W 52/0212* (2013.01); *H04W 52/18* (2013.01); *H04W 52/54* (2013.01); *Y02D 70/00* (2018.01); *Y02D 70/1262* (2018.01); *Y02D 70/142* (2018.01); *Y02D 70/144* (2018.01); *Y02D 70/164* (2018.01); *Y02D 70/166* (2018.01); *Y02D 70/22* (2018.01); *Y02D 70/26* (2018.01)

(56) References Cited

U.S. PATENT DOCUMENTS

| | | | |
|---|---|---|---|
| 8,649,768 B1* | 2/2014 | Gaddam | H04W 12/06 455/411 |
| 9,240,084 B2* | 1/2016 | Vardi | G08B 13/1463 |
| 9,369,875 B1 | 6/2016 | Mese et al. | 455/418 |
| 9,384,654 B1* | 7/2016 | Chillappa | G06Q 10/08 |
| 9,591,441 B2 | 3/2017 | Kuhl et al. | H04W 4/02 |
| 2004/0162880 A1* | 8/2004 | Arnone | H04L 12/1895 709/206 |
| 2007/0106775 A1* | 5/2007 | Wong | G01S 5/0284 709/223 |
| 2007/0254604 A1* | 11/2007 | Kim | H04W 84/18 455/88 |
| 2009/0251318 A1 | 10/2009 | Ho | 340/571 |
| 2014/0005809 A1* | 1/2014 | Frei | H04L 29/1249 700/90 |
| 2014/0118136 A1 | 5/2014 | State | 340/539.11 |
| 2014/0274088 A1* | 9/2014 | Talwar | H04J 11/0023 455/452.1 |
| 2014/0329500 A1 | 11/2014 | Wang et al. | 455/411 |
| 2015/0264731 A1* | 9/2015 | Lin | H04L 67/26 455/41.2 |
| 2016/0095017 A1* | 3/2016 | Ely | H04W 4/027 455/454 |
| 2016/0285717 A1* | 9/2016 | Kim | H04L 12/2803 |
| 2016/0308962 A1* | 10/2016 | Hegde | H04L 67/1095 |

\* cited by examiner

PORTABLE OBJECT DETECTION SYSTEMS AND METHODS FOR MUTUAL MONITORING BASED ON COOPERATION IN A NETWORK INCLUDING DEVICES WITH ASYMMETRIC AND CONSTRAINED POWER CAPACITIES

CROSS-REFERENCE TO RELATED APPLICATION

This application claims priority to Korean Patent Application No. KR 10-2016-0077243 filed on Jun. 21, 2016, the disclosure of which is incorporated herein by reference.

FIELD

The present disclosure relates to a technology that prevents personal valuable items such as a smartphone, a wallet, a key, and a handbag from loss and theft, and in particular it focuses on a network monitoring and management technology of a network consisting of devices with asymmetric and constrained power capacities.

BACKGROUND

Although a smartphone, a key, a wallet, and a handbag are a device and items that are necessary to be kept when going out, they are very vulnerable items that can be lost. If these items are lost, then it will result in a significant loss of economy and time as well as a psychological damage for their owner. Particularly, the inner contents of the smartphone contain all personal information such as phone numbers, schedules, and other privately sensitive things as well as a certificate for financial transactions and credit card information. Even worse, it will significantly influence material loss and psychological impact, which is incomparable to the loss of a traditional wallet or a credit card. Furthermore, the current smartphone unlike an old phone in the past is such a valuable and expensive thing such that it costs around $1,000, and if it is found by someone, then it may be possible to sell it to other people and it will rarely return to the smartphone owner. Therefore, the lost mobile phone is not returned to the owner.

At present, Apple and Google as a manufacturer of a mobile phone's operating systems like iOS and Android provide a kill switch program like "Find My iPhone" service by Apple, Inc. and "Device Manager" by Google, Inc., and in case of loss and theft of a phone, a phone owner has to use another phone or a computer to display the location on the map in order to track the phone that is expected to be lost or stolen. In addition, it can attempt to find the phone by generating maximal alerting sound, and it can remotely erase all the content of the phone which may be lost or stolen when it is determined not to obtain the phone in the worst case. But this technology cannot properly support necessary measures even at the just instant when the phone is actually lost or stolen. When an owner of the lost phone cannot access his own phone at that moment, he has to find and access his own computer or borrow his neighbor's phone at that time. Due to a delay of an initial reaction, only this technology gives a lack of usefulness and inconveniences for providing proper measures. And in the case of Apple, Inc., an anti-loss method of an Apple watch and a wireless earphone called AirPods which is connected to a smartphone both work in the same manner like a smartphone. This anti-loss method is possible to be only applicable when the corresponding device and the smartphone are located within a mutual communication range, and it is difficult to even apply for the case when it is out of range.

Furthermore, except in the case of a wearable device like a watch, when portable items such as a wallet, a key, and other valuable things that are possessed by a smartphone's owner are lost or stolen, a method which can extend to a search space and an operating time to find the lost and stolen thing by mutual monitoring based on cooperation between a smartphone and portable things has not been raised yet.

SUMMARY

When loss or theft is anticipated, then it is required to detect a smartphone and portable items as quickly as possible. To do this, it is wise to monitor them with a short detection interval. But this creates technological disadvantages by accelerating the waste of a device's power with a constrained capacity. Thus, it is difficult to use with this scheme for a long time. In general, monitoring between two devices can be easily implemented. On the other hand, mutual monitoring among multiple devices where all the devices have each different and limited power capacity is not easy because it requires more power consumption due to the existence of more communication paths.

Traditional measures for a lost smartphone work like that. When the loss is determined to have occurred, then by using another smartphone or a computer within proximity, it enables to remotely perform operations such as identifying the location, announcing alerts, deleting data, and other actions. But in the case of valuable portable items such as a wallet and keys not a smartphone, when it exceeds a specific distance which is considering to be loss and theft, there are no ways to react except it simply provides alert sounds and alert lights, and it is necessary to expand a search space to find a smartphone and portable items which are considered to be lost by the aids of a smartphone and items of family and/or friends.

The inventors of this disclosure have been doing research about a methodology of anti-loss and anti-theft, which can form a cluster (group or team) network consisting of valuable devices and items by mutually monitoring device and items, and enables to expand a search space and an operating time by mutual cooperation in a real-time basis with low power consumption and fast detection.

By deciding on whether loss/theft has actually occurred or not through mutual monitoring between a device and valuable items, it prevents in advance through proper responses for this occasion, and when loss or theft has actually occurred, it is possible to expand a search space to find the corresponding device and items by only registering family/friend/co-worker. For this, in order to be discovered as a device or items by some specific family or friend or co-worker who are previously registered, it is required to be found by only the registered persons via the exchanges of a device identifier and/or relation information of the possession about a smartphone, valuable items, and friend's smartphones. If needed, we propose a crowd-based detection technology for a public purpose, which can extend to an anti-loss/anti-theft campaign in the whole community by relieving search conditions, i.e., from a family/friend/co-worker to the public, thereby allowing participation for the search of others' lost items. This invention emphasizes on such realities and desires.

Another embodiment of this disclosure is to propose a prevention of loss/theft by using a minimal number of transmissions in mutual communications between a smartphone and devices where a smartphone and devices attached to items have an asymmetric and constrained power capacity because a smartphone has relatively more power capacity rather than tiny devices attached to items.

On the other hand, other purposes that are not specified in this disclosure will be additionally considered within the scope that is easily inferred from the following detailed explanations and the effects.

To accomplish this task, the first stage of the present disclosure as a portable object detection system comprises of a portable object that matches to at least one small communication device (SCD); a first cluster network that contains a first cluster head device (CHD), wherein the first CHD as a smartphone registers the SCD in advance, and that executes mutual monitoring between the SCD and the first CHD; a second cluster network that contains a second CHD which registers information about SCDs in the first cluster network in advance, wherein the second CHD as a family device is registered in advance at a detection server through a request of the first CHD or the SCD in the first cluster network; and a detection server that requests mutual monitoring about SCDs as a lost target in the first cluster network by the second CHD when an event of a loss is received from the first CHD in the first cluster network, wherein the first CHD and the second CHD are included and managed, an adjustable message transmission interval, wherein a message transmission interval sent from the first CHD to the SCD is modified by any parameter among local timestamp, next wakeup timestamp, sync timestamp, location information, mobility, and power capacity of the SCD and the first CHD which are collected by mutual monitoring.

In a portable object detection system in accordance with an embodiment of the present disclosure, it adjusts a radio transmission power, wherein a radio transmission power sent from the first CHD to the SCD and a radio transmission power sent from the SCD to the first CHD are modified by any parameter among local timestamp, next wakeup timestamp, sync timestamp, location information, mobility, and power capacity of the SCD and the first CHD which are collected by mutual monitoring.

Also, in a portable object detection system according to an embodiment of the present disclosure, it adjusts a radio transmission power for transmitting a push message in the first cluster network, wherein the first CHD in the first cluster network detects a possibility of a loss for the SCD.

Also, in a portable object detection system according to another embodiment of the present disclosure, it adjusts a radio transmission power for transmitting a pull message in the first cluster network, wherein the SCD in the first cluster network detects a possibility of a loss for the CHD.

In a portable object detection system according to another embodiment of the present disclosure, it executes mutual monitoring, wherein an SCD belonging to the first cluster network or an SCD belonging to the second cluster network is searching for the first CHD or the second CHD belonging to each family device when an event of a loss for the first CHD or the second CHD has occurred.

The second stage of the present disclosure as a portable object detection system comprises of registering in advance at a detection server, wherein a first cluster network is configured by registering mutual device information about a portable object (SCD) matching to at least one small communication device and a first cluster head device (CHD) as a smartphone; transferring information about an SCD and/or a first CHD in the first cluster network to a second CHD by the detection server, wherein the first CHD and/or the SCD registers in advance a second CHD in a second cluster network as a family device which has already registered at the detection server; performing mutual monitoring between the SCD and the first CHD in the first cluster network; and requesting mutual monitoring for the first CHD and/or the SCD as a lost target of the first cluster network by the second CHD in the second cluster network, when the detection server receives an event of a loss from the first CHD and/or the SCD in the first cluster network, performing the mutual monitoring further comprises transmitting a message, wherein the first CHD sends a message to the SCD, and the SCD sends a message to the first CHD, adjusting a message transmission interval of the message, wherein local timestamp, next wakeup timestamp, sync timestamp, location information, mobility, and power capacity of the SCD and the first CHD are collected by mutual monitoring.

In a portable object detection method according to an embodiment of the present disclosure, it adjusts a radio transmission power, wherein local timestamp, next wakeup timestamp, sync timestamp, location information, mobility, and power capacity of the SCD and the first CHD are collected by mutual monitoring.

According to an embodiment of our disclosure, by cooperating adaptively depending on the situations between a smartphone and devices equipped with valuable items, it is possible to provide an appropriate detection by monitoring communications based on mutual cooperation just before loss/theft has occurred.

In another embodiment, it prevents loss/theft due to effective management to communicate by considering available power capacity of portable items in terms of communications in a cluster network.

Previous approaches mainly focused on schemes where a smartphone gives preventive measures of loss/theft to valuable items or vice versa. In yet another embodiment, by extending these schemes, it enables to mutually monitor on lost/theft between a smartphone and items, and even if loss/theft has occurred, then previously registered adjacent smartphones (for example, family/friend's smartphones) or items are possible to expand its search space to find the corresponding smartphone and items. Therefore, finding an opportunity for them can be increased. In particular, it can be helpful to manage livestock/pets as well as elder people, and missing children, and even to use it for special missions and duties by the military and the police.

In accordance with another embodiment of the present disclosure, this approach to simply prevent loss and theft from a smartphone and valuable items is also applicable to support operations and monitoring for all of the portable things in general. By extending into a network where a specific device has a more powerful capacity rather than the rest of devices, it can be used as a means for providing smooth communications among all the devices belonging to the corresponding network.

In another embodiment, this approach can even apply to find certain products in a large wholesale store or a warehouse by a consumer's smartphone where a small communication device is attached to each product, using an application for preventing loss and theft of products.

Attached diagrams are revealed to illustrate as references for understanding the technological concepts of this disclosure. Due to these diagrams, the claimed scope of this disclosure is not restricted.

DETAILED DESCRIPTION

Since embodiments of the present disclosure are merely examples for structural or functional description, the scope of the present disclosure will not be limited to the embodiments described herein. That is, since the embodiments may be variously modified and may have various forms, the scope of the present disclosure will be understood as including equivalents thereof which can embody technical concept thereof.

Figure 1:
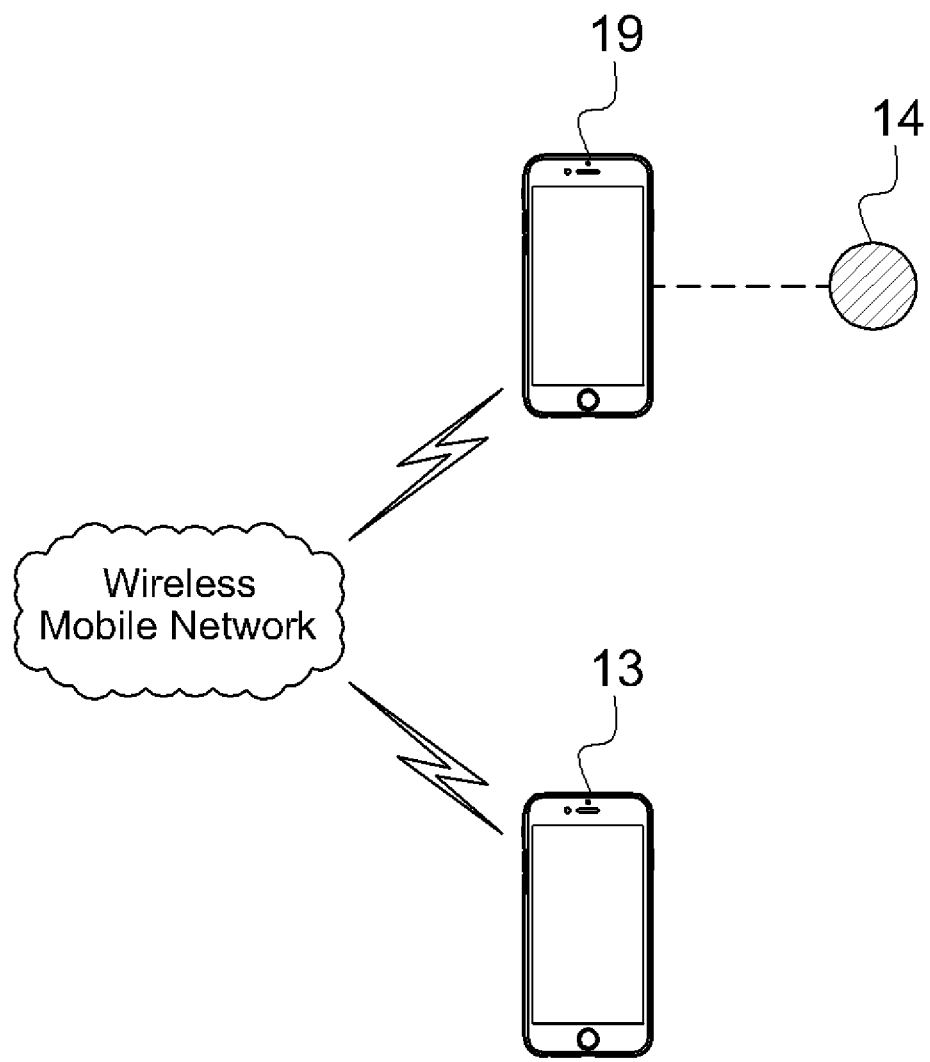
FIG. 1 is a conceptual configuration of a smartphone's anti-loss and anti-theft system in general.

FIG. 1 depicts an example of a system configuration about conventional lost/theft methods. The present location of a first smartphone 19 connected to a wireless mobile network can be displayed on a map by a second smartphone 13 as another smartphone. And via the second smartphone 13, alert sounds can be generated and stored data can be erased from the first smartphone 19.

In order to prevent loss or theft from the first smartphone 19, it can trace the first smartphone 19 that is located within a certain communication range by using a tracker 14 equipped with a radio transceiver. Therefore, by attaching the tracker 14 to portable items, methods for protecting and tracking the corresponding items has been devised. But there exists a problem that results in too many excessive communications between the portable items and the connected smartphone that is required to mutually monitor at the same time in case of a plural number of items, thereby depleting too much power from the tracker 14 and bringing about a halt of its operations soon.

If the power of the tracker 14 is completely discharged, then those methods for preventing loss/theft from such smartphone and portable items may be useless.

Figure 2:
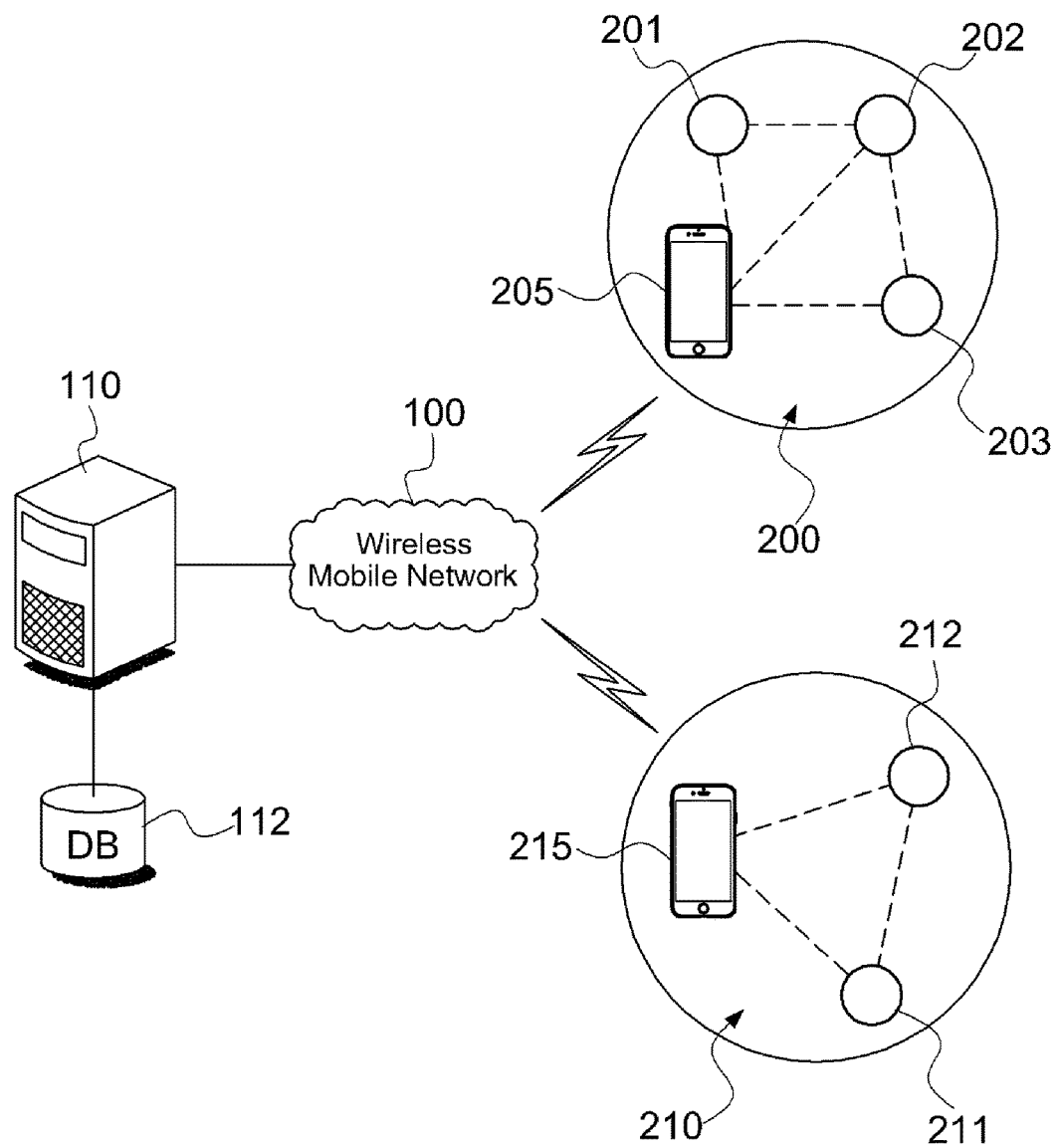
FIG. 2 illustrates a network system configuration, in accordance with an example embodiment.

In FIG. 2, an embodiment of a conceptual system configuration of this disclosure is illustrated. Our concept is completely different from traditional methods, which are shown in FIG. 1. Suppose that there exists a network consisting of a plural number of portable objects. The portable object consists of a portable item except for a smartphone as well as a smartphone with communication and computing functions in itself. For instance, we can name the portable items such as a wallet, a key, a credit card, a handbag, and others. For example, people who need care like kids or elder persons or animals like pets that need protection from loss/theft should be equipped with an item to be identified. This disclosure includes a network 100 consisting of portable objects as an extensional element, thereby adding electronic functions with a communication one and integrating it with portable objects except for a smartphone.

In an embodiment of this disclosure, each portable object is not working as a network element that is configured individually. A cluster network 200, 210 consisting of portable objects is integrated with the whole wireless mobile communication network 100.

In the case of a smartphone, it is a core device of the corresponding cluster network because it has various wireless transmission and reception modules with built-in 3G/LTE (Long Term Evolution), Wi-Fi, NFC (Near Field Communication), Bluetooth, and other communication means. Portable objects except for a smartphone, i.e., portable objects like portable items, match with (e.g., are paired with, are coupled with, etc.) a small communication device (SCD) capable of supporting communications (thereof this will be described later). A meaning of the matching is that by attachment, installation, insertion, adhesion, bonding, fixing, and other actions, a small communication device is installed internally in the portable objects or integrated with an external side of the portable objects. Thus, general portable things can also be made as another element in a network at the center of the smartphone.

We define a cluster network as an independent and individual network that consists of a plural number of portable objects and is mutually connecting to. For an efficient control of the cluster network, a cluster head device (CHD) is required. A smartphone 205, 215 can be taken as a cluster head device for granted. A smartphone that corresponds to as a cluster head device is working as a gateway capable of connecting to an external network 100 and internal networks 200, 210 because the smartphone has a wireless communication module which enables to connect to portable objects as elements of the corresponding network, it also has various communication modules connected to an external network, and it is the largest power capacity among elements in a cluster network.

In a cluster network of FIG. 2, a portable object working as an individual SCD is belonging to the network. A portable object SCD 211 (for example, a key) and another portable object SCD 212 (i.e., a wallet), and a portable object CHD 215 (a smartphone) are connected to the network. The cluster network 210 reports a detection server 110 via the CHD 215 periodically or when an event has occurred. Moreover, the detection server 110 can monitor portable objects 201, 201, and 203, belonging to the corresponding cluster network 200, and an adjacent CHD 205 (a CHD in a second cluster network).

In a cluster network 210, portable objects may be configured and connected to one another as a wireless mobile ad hoc network or a wireless mesh one. In a traditional wireless mobile ad hoc (or mesh) network, each element in a network can autonomously move, go out of the network, or newly join the network. But in this disclosure, because a user owns a smartphone and portable objects in an adjacent clustered way, each element in the network is either moving together or not. In the case of loss and theft, it means that the corresponding portable objects belonging to the network are exceeding over its network communication range.

The detection server 110 coordinates, operates, manages, and supports a cluster network consisting of the whole CHD(s) and portable objects accompanying with the CHD. Moreover, a database 112 about portable objects (including a smartphone) is constructed, stored, registered, administered, and managed at the detection server. Owner information about the portable object, user information about an adjacent cluster head device, varieties of historical information about the portal objects are stored and managed. In another embodiment of this disclosure, on behalf of mediation by the detection server 110, directly adopting a peer-to-peer communication method between CHD and SCDs is also possible without invoking the detection server.

An SCD in this disclosure can be designed and manufactured into a small circular type's device, which can be attached to any type of portable items with ease. Nonetheless, as illustrated in FIG. 3, if an embodiment has a type containing an internal electronic configuration, then it can be variously modified.

Figure 3:
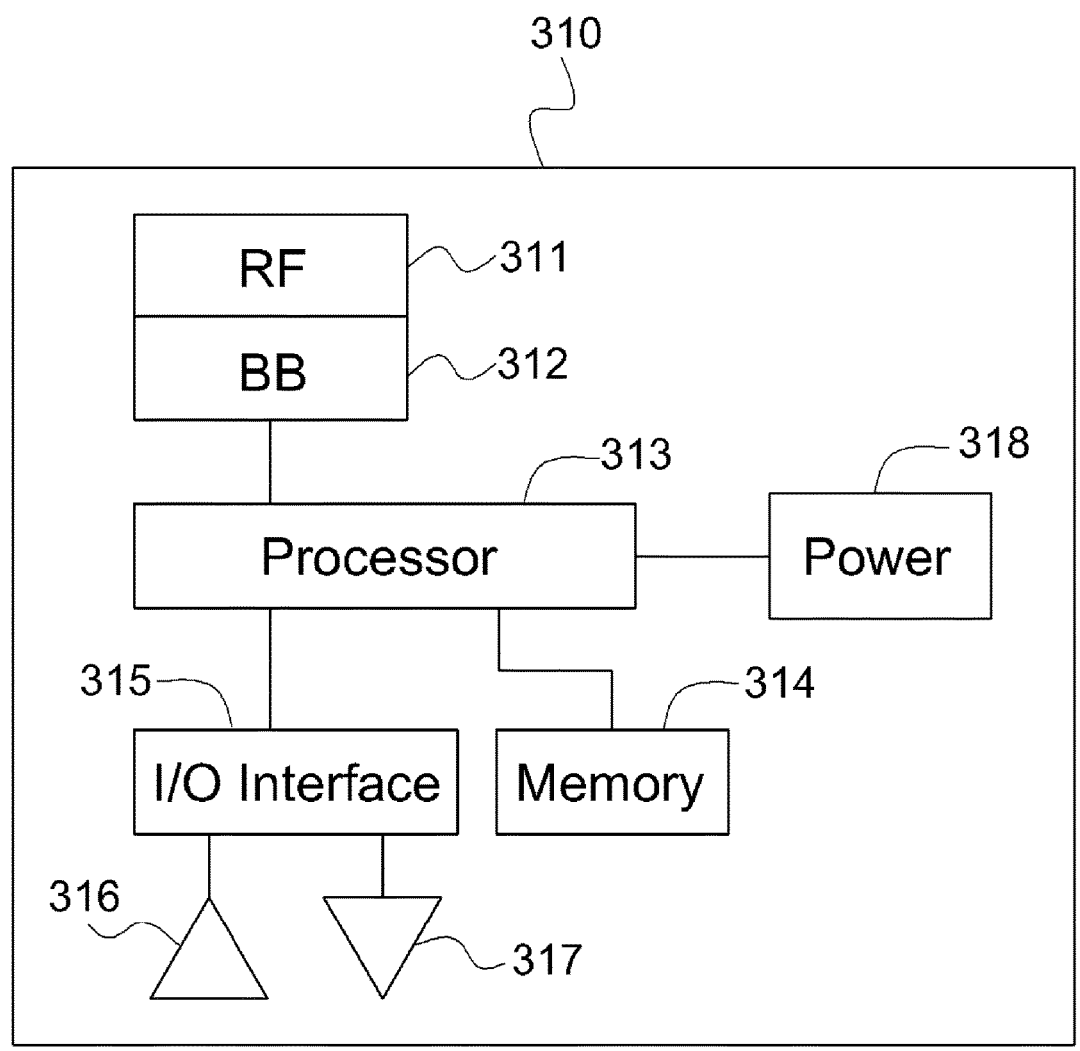
FIG. 3 depicts an internal electronic configuration of an SCD 310 according to an example embodiment.

FIG. 3 shows an example of an internal electronic configuration in a SCD 310 as an embodiment of this disclosure. An SCD 310 can be understood as a small computer module with a wireless mobile communication function including sensor(s) and actuator(s). As illustrated in FIG. 3, the SCD 310 contains an RF unit 311, a baseband unit 312, a processor unit 313, an input/output interface unit 315, a memory 314 unit, a power unit 318, sensors 316 and actuators 317. If a software defined radio (SDR) technology is applicable to an embodiment of this disclosure, then the RF unit and the baseband unit are working together in the form of software, not individually. Thus, without loss of generality, the configuration of FIG. 3 is applicable to any embodiment example.

An RF unit 311 provides wireless communications capability. A baseband unit 312 gives modulation and demodulation functions. A memory unit 314 stores programs and input/output data, a processor unit 313 performs various functions by processing programs and data. A sensor 316 includes at least one sensor among an acceleration sensor, an optical sensor, a motion sensor, an acoustic sensor, a proximity sensor, and a location sensor, and an actuator 317 feeds back responses about portable objects which is installed at an SCD 310 to the outside. In an embodiment of the present disclosure, an actuator 317 has at least one actuator among a motor, a speaker, an LED (Light Emission Diode: LED) lamp, and a button. The motor generates vibrations, the speaker produces alert sounds, and the LED lamp displays a warning light when the portable objects are away from a certain distance. An owner of the SCD can press the button to activate some actions like generating radio signals, lights, sounds, magnetic fields, or vibrations to find a smartphone and other portable objects. A power unit 318 can produce an electrical power by using a rechargeable battery like a lithium ion one and can be replaced with various power sources such as a solar battery panel and a wireless charger. The RF and baseband units provide at least one wireless communication means such as a low power based mobile device-to-device communication like Wi-Fi, BLE (Bluetooth Low Energy) and others like a GPS (Global Positioning System) to measure a location.

Figure 4:
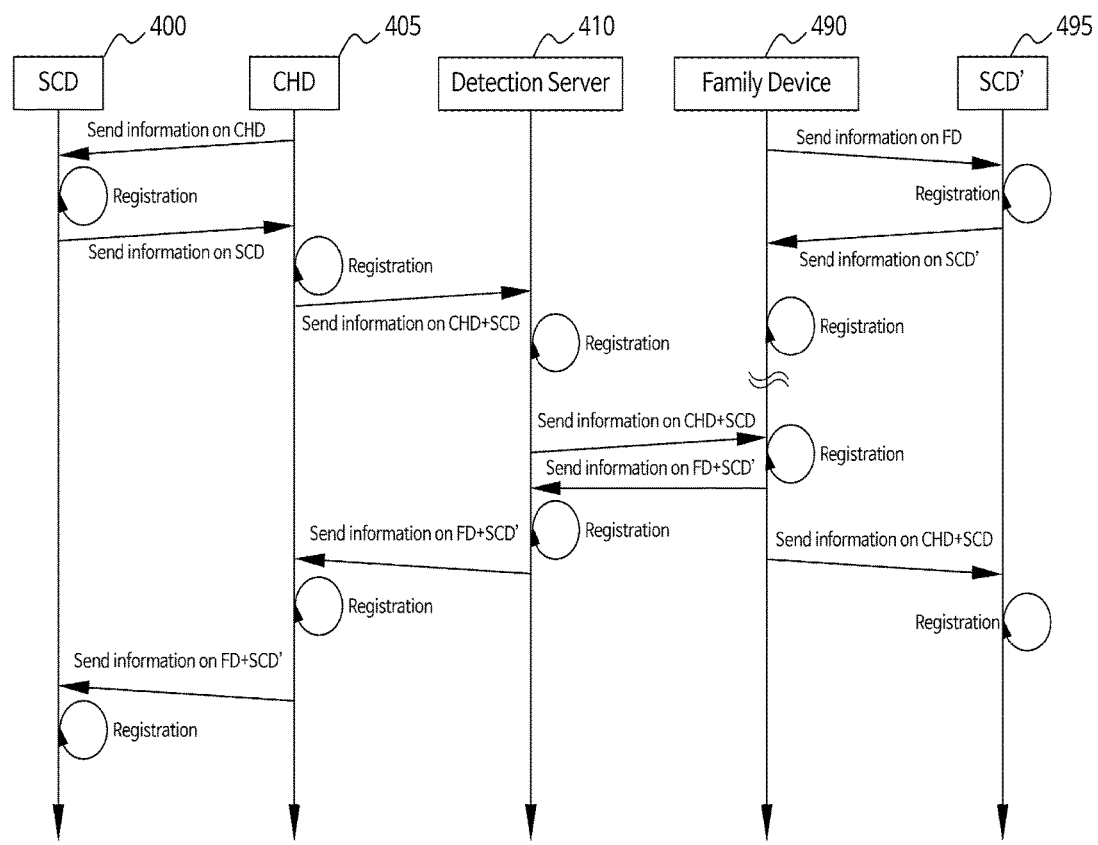
FIG. 4 is a schematic diagram illustrating a pre-registration process to obtain services according to an example embodiment.

FIG. 4, as an embodiment of this disclosure, is a diagram so that by centering on a registration procedure of portable objects, occurrences of events and processing relationships between each element in terms of space and time dimensions are also shown in the figure at the same time.

A portable device such as a smartphone (CHD, 405) requests a registration in order to connect to and associate with portable objects (SCD, 400) by providing an identity information like a MAC (Medium Access Control) address and/or an owning relationship (owning, owned, none, and private/public) to an SCD. Then the SCD 400 in itself registers the received information and responds by sending its own identifier like a MAC address and/or its owning relationship to the CHD 405, where the CHD 405 registers the received SCD's information. With the same methods, other portable objects (SCD', 495) belonging to a family device 490 follows the same registration procedure by mutual provisions of the information. The CHD 405 transfers object information that is registered to its own cluster network to a detection server 410. The detection server 410 registers the received information into its own DB (Data Base) and at the same time requests registration by transferring the received information to the family device 490 having a family relationship with the CHD 405, and the family device transfers to a portable object (SCD', 495) information which was registered to its own network to a detection server 410 and causes it to register, and the corresponding information is transferred to the CHD 405 and the SCD 400 and the information of the family device 490 and the SCD' 495 is also registered in the same way. All the smartphones 405, 490 with a family relationship and all the portable objects 400, 495 belonging to the smartphones are sharing information about other objects' identification and status by means of exchanges and registrations of mutual information.

By configuring with the above procedures, a user can get help from a family device that is previously registered when the user's smartphone or valuable items are missing or stolen. Because the family device 490 is possible to work as the function of the aforementioned CHD in its own cluster network, it can give an eminent effect so that portable objects that connect to the corresponding cluster network are possible to be monitored simultaneously.

Figure 5:
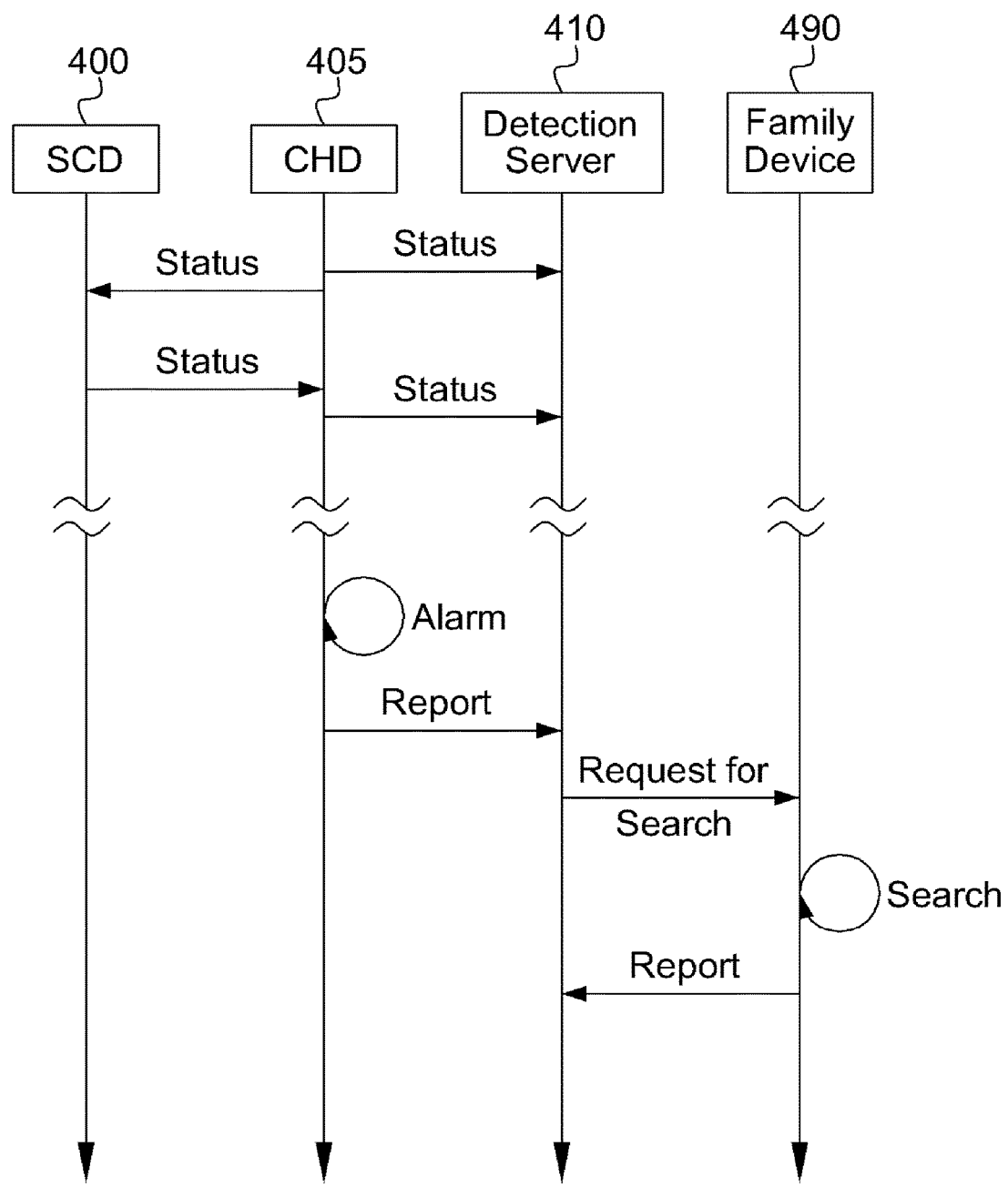
FIG. 5 illustrates a diagram about a mutual cooperation process between portable objects and a pre-registered family device 490 when portable objects are monitoring in real-time and loss events are occurring according to an example embodiment.

FIG. 5 schematically illustrates a responding process to monitor items and to perform in an event of loss/theft in accordance with an embodiment of this disclosure. A portable object SCD 400 is monitoring on a CHD 405 based on status information given by the CHD. The CHD 405 is also monitoring on an SCD based on status information provided by a portable item SCD 400. The CHD 405 and the portable object SCD 400 send and receive its status information, and the status information is transferred to a detection server 410. If the portable object 400 is lost or stolen, then the status information cannot be sent to the CHD 405. In this case, the CHD 405 notifies a loss/theft of the portable object to the detection server 410. The detection server 410 is requesting a search of the portable object SCD 400 for the family device 490 which has already been registered in advance.

When a user thinks of loss/theft of portable items, there exists an empirical rule so that in general, a family or a friend of a user in a situation of loss/theft may have more possibilities to find the lost portable items or to be located near it.

Again back to FIG. 5, a family device 490 that gets a request for searching a SCD 400 by a CHD 405 has to discover the corresponding SCD, i.e., the family device 490 has to search for the portable object 400. If it cannot find it, then its search result is transferred to a detection server 410. The detection server 410 takes the following proper measures that respond for the loss/theft according to a previously determined time or an established procedure. For instance, the following measures for the loss/theft does mean that depending on a type of the lost/stolen device, in case of a smartphone it provides automatic reports to a telecommunication company, and in case of a credit card inside of a wallet, then it directly reports to a card issuing bank because the credit card is lost.

According to this disclosure, mutual monitoring by the user's smartphone and the user's family's smartphone can discover portable objects. In this case, mutual monitoring is not limited to both of the first smartphone and the second one, but can also discover a smartphone and portable items that are estimated to be lost or stolen via extensive mutual monitoring by portable objects or by portable objects and an adjacent smartphone.

Figure 6:
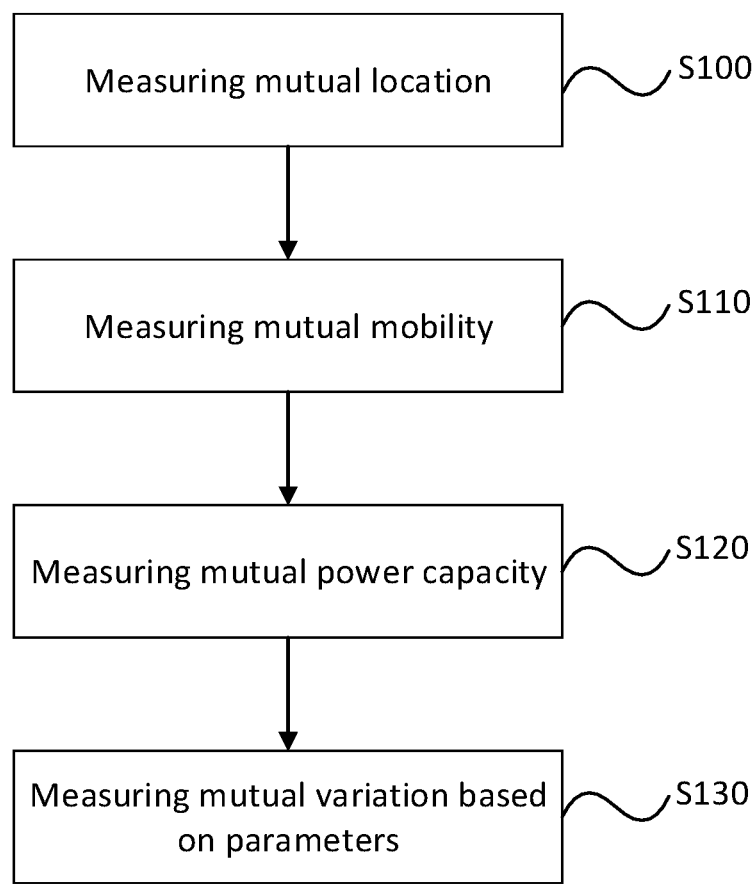
FIG. 6 illustrates a diagram for illustrating a mutual monitoring process between a CHD and SCDs in a cluster network in accordance with an example embodiment.

FIG. 6 also schematically shows a mutual monitoring process for a smartphone and portable objects between a CHD and SCDs, as an embodiment of this disclosure. In accordance with another embodiment of this disclosure, the process collects parameters for mutual monitoring and executes mutual monitoring depending on the varieties based on these parameters. The parameters of this disclosure are collected in S100, S110, and S120 phases. But sequences of these phases are not necessarily required to follow up the sequences as shown in FIG. 6, but we additionally mentioned that measurement on parameters is performed at the same time or in another sequence.

First of all, mutual location by a location information sensor at each device are received and measured (S100). In consequence, using a motion sensor and/or an acceleration one, directional mobility and/or speed are measured (S110). In the next step, available power capacity of a battery at each device is measured in a real-time basis (S120).

And in the next step, each device performs mutual monitoring (S130) using parameter data measured at the above phases. These parameters as shown in FIG. 6 consist of a location parameter, mobility one, and a power capacity one.

Data items that are measured and monitored by the process shown in FIG. 6 are stored at a device. In another embodiment of this disclosure, a CHD and SCDs can store historical data (minimum, maximum, average, standard deviation, and more) per each time interval as well as location, direction/speed, remaining power of a battery, transmission power and reception sensitivity which are measured at each device. Under the necessity, aside from storing data from a CHD and SCDs, to promptly support mutual monitoring, even a detection server has its own storage management.

Figure 7:
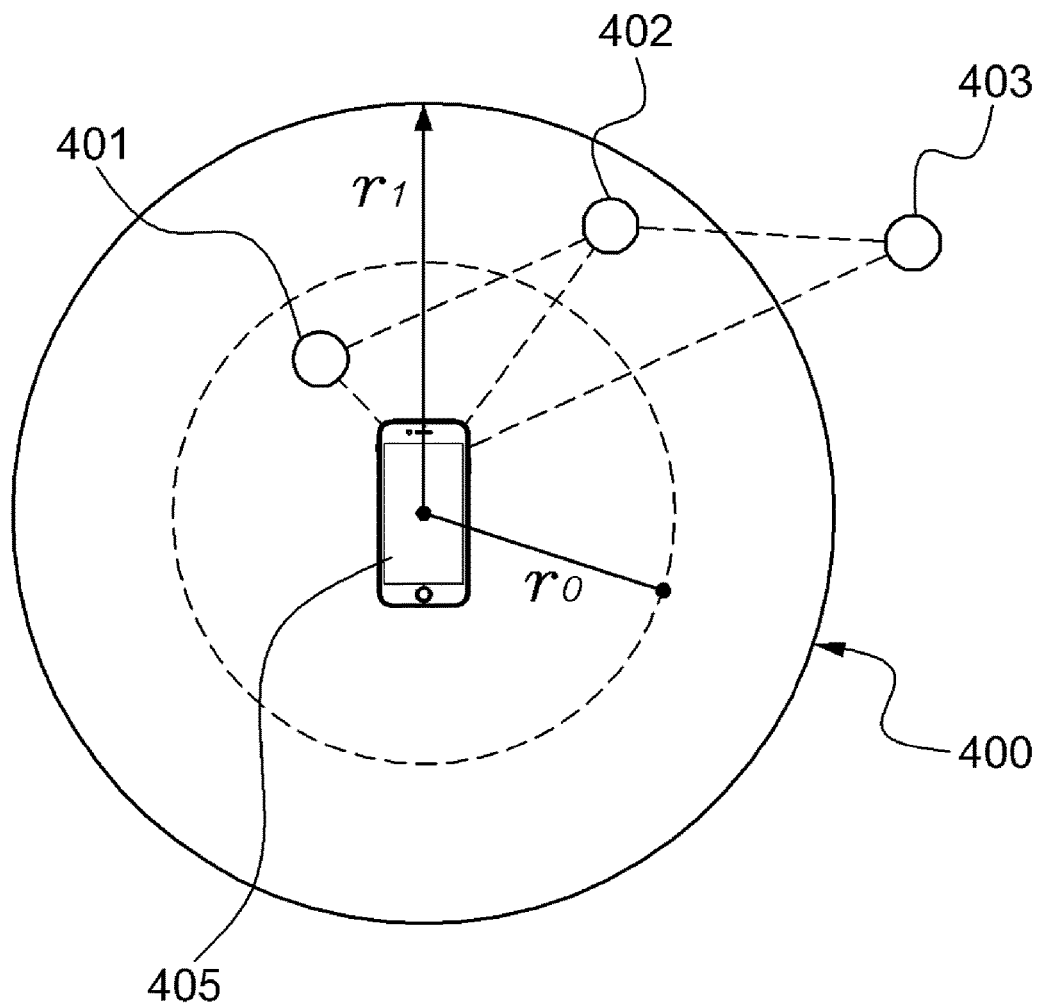
FIG. 7 depicts a relationship between CHD 405 and SCD 401, 402, 403 in a cluster network according to an example embodiment.

In FIG. 7, centering on a CHD 405, suppose that each portable object SCD 401, 402, 403 be a constituent member in a cluster network 400. In FIG. 7, an SCD 401 is located within a radius $r_0$ of a previously determined minimal secure distance, an SCD 403 is located over a radius $r_1$ of a previously determined limit distance, and between $r_0$ and $r_1$, an SCD 402 is located. Depending on the result of the location measurement, mutual relations between the CHD 405 and the SCDs 401, 402, 403 are varying. For instance, to conduct mutual monitoring, an intensity of a wireless radio transmission power needs to be adjusted.

In another embodiment of this disclosure, a CHD 405 adjusts an interval of a push message, as a message that is to be sent for mutual monitoring of an SCD. In FIG. 7, when an SCD 403 exceeds a limit distance $r_1$, a risk of loss/theft increases. On the other hand, because an SCD 401 is located within a secure distance $r_0$, a risk of loss/theft is so small, thus it may be in a safe location. Therefore, regarding the SCD 403, a radio transmission power of the CHD 405 needs to be increasing, and it is desirable to shorten an interval of a message transmission for a prompt detection.

Figure 8:
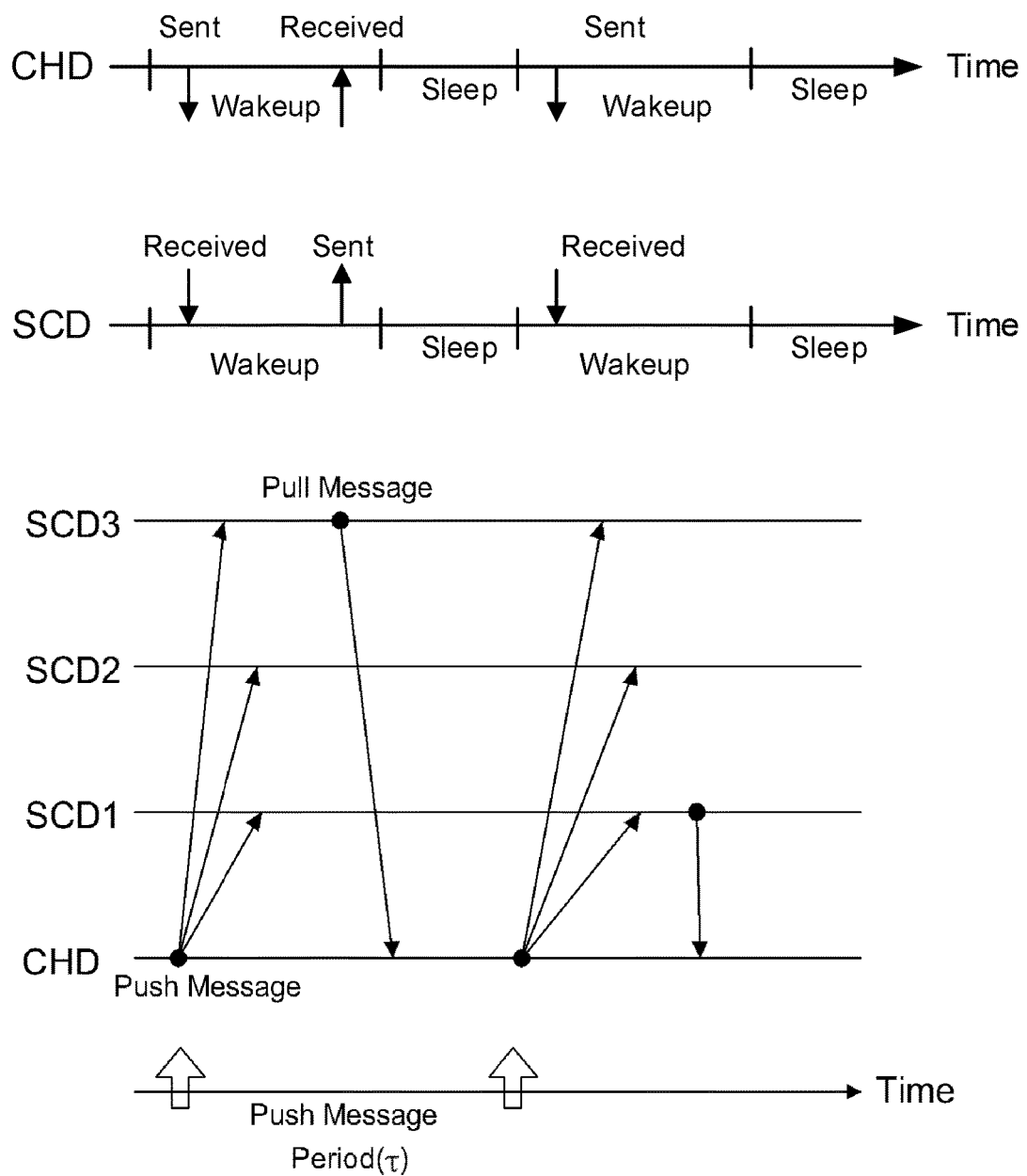
FIG. 8 is a schematic diagram illustrating a relation between a push message and a pull one which performs on constituent elements in a cluster network according to an example embodiment.

Let us look at FIG. 8. As shown in FIG. 8, in a cluster network consisting of portable object SCDs and a CHD, it conceptually represents how to handle the power capacity and transmission interval in terms of communication methods between a CHD and SCDs. The SCD has a low power capacity and limited functions rather than the CHD. Therefore, inventors of this disclosure emphasize essential methods, in which it enables to use an SCD's power effectively and expand its operating time for mutual monitoring.

To reduce power consumption of devices of CHD and SCD, they cannot wake up all the time to operate and an alternating cycle of wakeup and sleep needs to be occurred periodically, and if total sleep time is larger than total wakeup one in terms of the whole operating time, then it will be the most desirable case.

In order to communicate mutually between devices at an arbitrary distance x, due to a path loss of radio propagation between two points, a transmission power $P_{sent}(X)$ demands 100 billion times much more power than a reception power $P_{recv}(x)$. To communicate for a long time with a constrained power, if possible, an SCD with a low power capacity is required to minimize a number of transmissions.

$$P_{sent}(x) \gg P_{recv}(x)$$

It means that for smooth communications, a reception operation is more frequently permitted while a transmission one is possibly constrained.

If it is possible, it is desirable to reduce a number of communication messages exchanged between devices. A broadcasting or flooding that is requiring a communication message complexity $O(n^2)$ (where n is the number of devices belonging to a network) is in general excluded, whereas all of the devices are autonomously participating in communications for mutual monitoring.

And when a limit distance exceeds over a measured one between a CHD and an SCD, a measured directional mobility is exceeding over a previously determined limit, or a measured power capacity is also exceeding over a previously determined limit value, the corresponding SCD transfers a message that is to be sent called a pull message to the CHD because the SCD and/or the CHD may be a chance to be under an unsafe status. To consume radio power minimally, a radio reception operation is always permitted for an SCD under an unsafe status and a CHD during the wakeup time interval while both of an SCD under an unsafe status and a CHD only allow their transmission operations.

The rest of SCDs do not send a pull message to the CHD to save their retention power. By doing this, a message communication complexity is trying to be maintained at a range between O(1) and O(n). In FIG. 8, when the retention power of an SCD1 exceeds over the limited value, a pull message is sent to the CHD. When an SCD3 is exceeding over its limit distance, then its pull message is sent to the CHD because there exists a high loss possibility. On the other hand, when an SCD2 is in a safe situation that is located below the previously determined criterion value, to save its retention power, a pull message is not additionally sent to the CHD.

When a measured distance is exceeding over the limit distance, or directional mobility exceeds over its limit, or a measured retention power is over the predetermined limit value, then the corresponding SCD immediately sends its measured value to the CHD. In order to share and update both information received from the SCDs and the CHD's own local information, then the CHD sends its push message to all of the portable objects SCDs at a message transmission interval τ in order to have an approximately consistent network topological view for a CHD and all of the SCDs, where a CHD and SCDs belong to the corresponding network. The message transmission interval is defined as a wakeup time interval established by a CHD. All the SCD devices are adjusting their wakeup time intervals by a next wakeup timestamp received from the CHD.

A CHD adaptively adjusts its next message transmission interval τ by reflecting approximately consistent global information using all the local timestamps and situation awareness information such as location, mobility, remaining power, and others. When the CHD and each SCD are in a safe status, to effectively save power consumption a push message is sent in a constant interval. When a specific situation expected to be loss and theft is to be occurred with a significant possibility, it tries to detect within fast time by reducing a message transmission interval τ. By configuring this out, it resolves a trade-off between energy efficiency and fast detection time.

In an embodiment of this disclosure, all the SCDs do not send a pull message periodically responding to a push message received from a CHD. To save power consumption, only an SCD sends its pull message to a CHD whenever there exists a certain situation that is expecting to have a limited power and/or a loss/theft possibility, i.e., exceeding over a specific distance. The SCD that is not relevant to this situation does not send a pull message periodically to the CHD for saving power. On behalf of it, the CHD which receives the corresponding pull message communicates with the whole SCDs in a transmission interval τ to share and update the corresponding information all across the network.

In another embodiment of this disclosure, a CHD and all the SCDs are needed to synchronize within all of the wakeup timestamps due to an existence of an inherent clock drift. A sync timestamp is computed by estimating a least common multiple of all the local timestamps of the CHD and SCDs.

Throughout the aforementioned configurations, to explain desirable operations between a CHD and SCDs according to this disclosure as an embodiment is as follows.

A CHD Communication Protocol:
(1) When a CHD receives a pull message with local information (local timestamp, location, directional mobility, retention power, and others) measured by an SCD, the CHD estimates both of a next wakeup timestamp and a sync timestamp (the least common multiple of next wakeup timestamps), and updates its own local information by reflecting the corresponding received information, and the updated information is an approximate global information which has changes of all the local information at the CHD and all of the SCDs since a last transmission interval. Then, it prepares a push message to share the updated information among all of the SCDs.
(2) It verifies whether a cluster radius measured from a SCD centering on the CHD is exceeding over the previously determined limit distance or not. In case of exceeding, it expects a possibility of loss/theft. Otherwise, it determines its safety against the loss/theft.
(3) When the SCD is moving with the CHD in the same direction and is within a mobility limit, a portable object is determined to be relatively safe against the loss/theft. And when the SCD is moving away from the CHD in an opposite direction and also exceeding over the previously determined mobility limit, then it expects a possibility of loss/theft.
(4) When a retention power of an SCD to be reported is smaller than the previously determined power limit, then the CHD expects to be a loss/theft for the corresponding SCD. And when a retention power is larger than the power limit, then it is determined to be safe.
(5) If a time to be estimated as a loss/theft of an SCD exceeds over the previously determined limit time, (1) an application of the CHD generates alerts like warning messages, vibrations, alert sounds and/or warning lights, and others; (2) by notifying of a loss/theft event via a detection server, a previously registered family device executes more than one process for requesting to search for the corresponding SCD; (3) If a possibility of a loss/theft exists, the CHD directly sends its previously prepared message to all of the SCDs by increasing its output power, and then it returns to a previous radio power status and maintains it again.
(6) If the corresponding estimated time is not exceeding over the limit time, then the CHD sends its previously prepared push message to all of the SCDs by adjusting the previously determined basic transmission interval and radio wave power.
(7) If a sync timestamp is matched within a range of the current local timestamp and its clock drift, the CHD always wakes up for a synchronization.

An SCD Communication Protocol:
(1) An SCD reflects an approximate global information (local timestamp, next wakeup timestamp, sync timestamp, location, directional mobility, retention power, and others) received from a CHD, the SCD reflects its next wakeup timestamp, and updates its own local information with the received approximate global information, and then it prepares a pull message to share the updated information among the CHD and all of the SCDs since a last transmission interval.
(2) It verifies whether a cluster radius measured from a CHD centering on the SCD is exceeding over the previously determined limit distance or not. In case of exceeding, it expects a possibility of a loss/theft. Otherwise, it determines its safety against the loss/theft.
(3) When the SCD is moving with the CHD in the same direction and is within a mobility limit, a portable object is determined to be relatively safe against the loss/theft. And when the SCD is moving away from the CHD in an opposite direction exceeding over the previously determined mobility limit, it expects a possibility of the loss/theft.
(4) When a retention power of the CHD to be reported is smaller than the previously determined power limit, then the SCD expects to be a loss/theft of a CHD, and when a retention power is larger than the power limit, then it is determined to be safe.
(5) If the estimated time of a loss/theft of the CHD exceeds over the previously determined limit time, (1) an application of the SCD generates alerts like warning messages, vibrations, alert sounds and/or warning lights, and others; (2) after the SCD searches for an adjacent CHD and connects to it, more than one process is executed to request a search for finding the corresponding CHD; (3) If a possibility of a loss/theft exists, the SCD increases its output power and maintains its previous radio power status by directly sending the previously prepared message to the CHD; 4) Each SCD maintains its own local information based on approximate global information provided by the CHD with its local information.

(6) If the corresponding estimated time is not exceeding over the limit time, then the SCD sends its previously prepared pull message to the CHD by adjusting the previously determined basic transmission interval and radio wave power.

(7) If a sync timestamp is matched within a range of the current local timestamp and its clock drift, then the SCD always wakes up for a synchronization.

Figure 9:
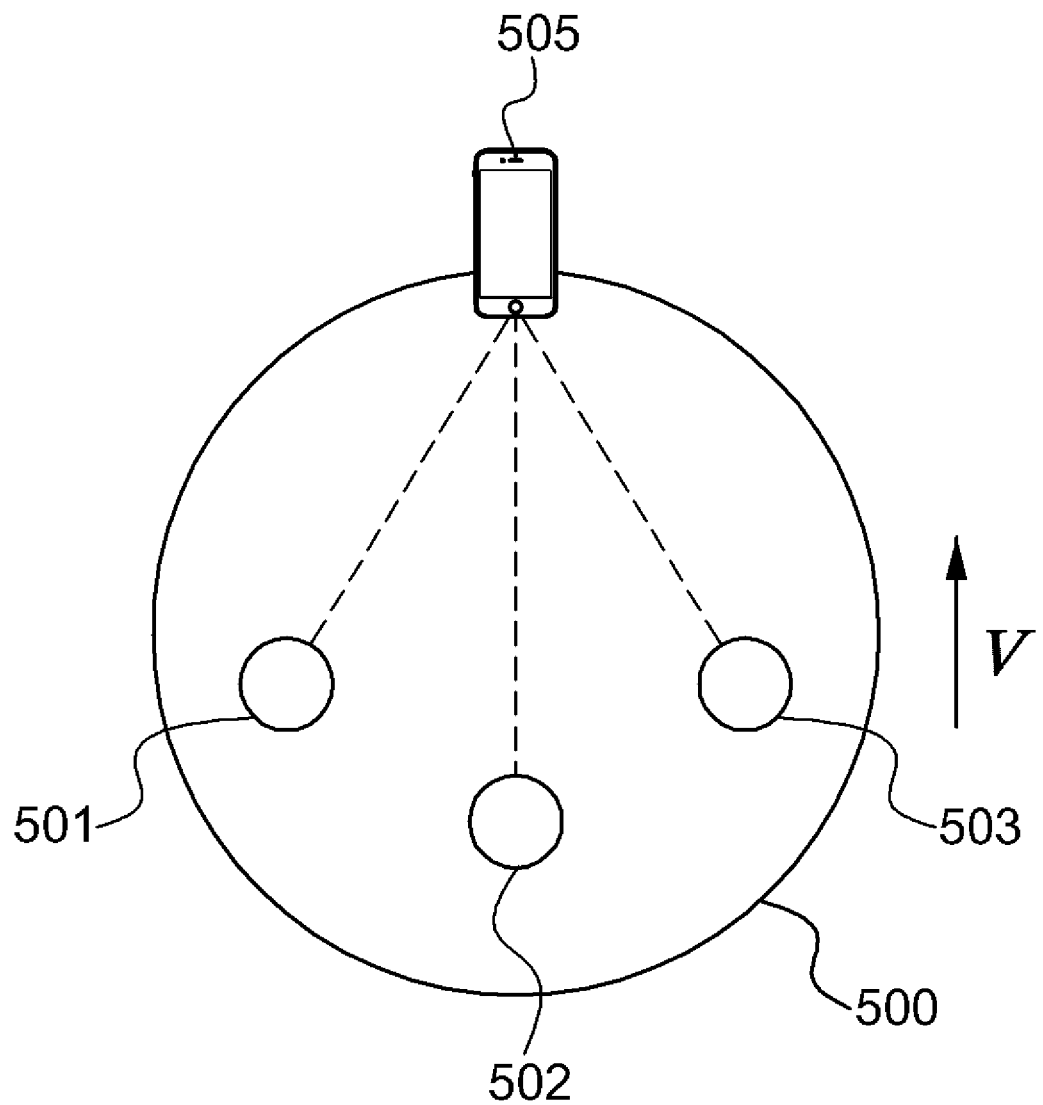
FIG. 9 depicts a cluster network in movement.
Figure 10:
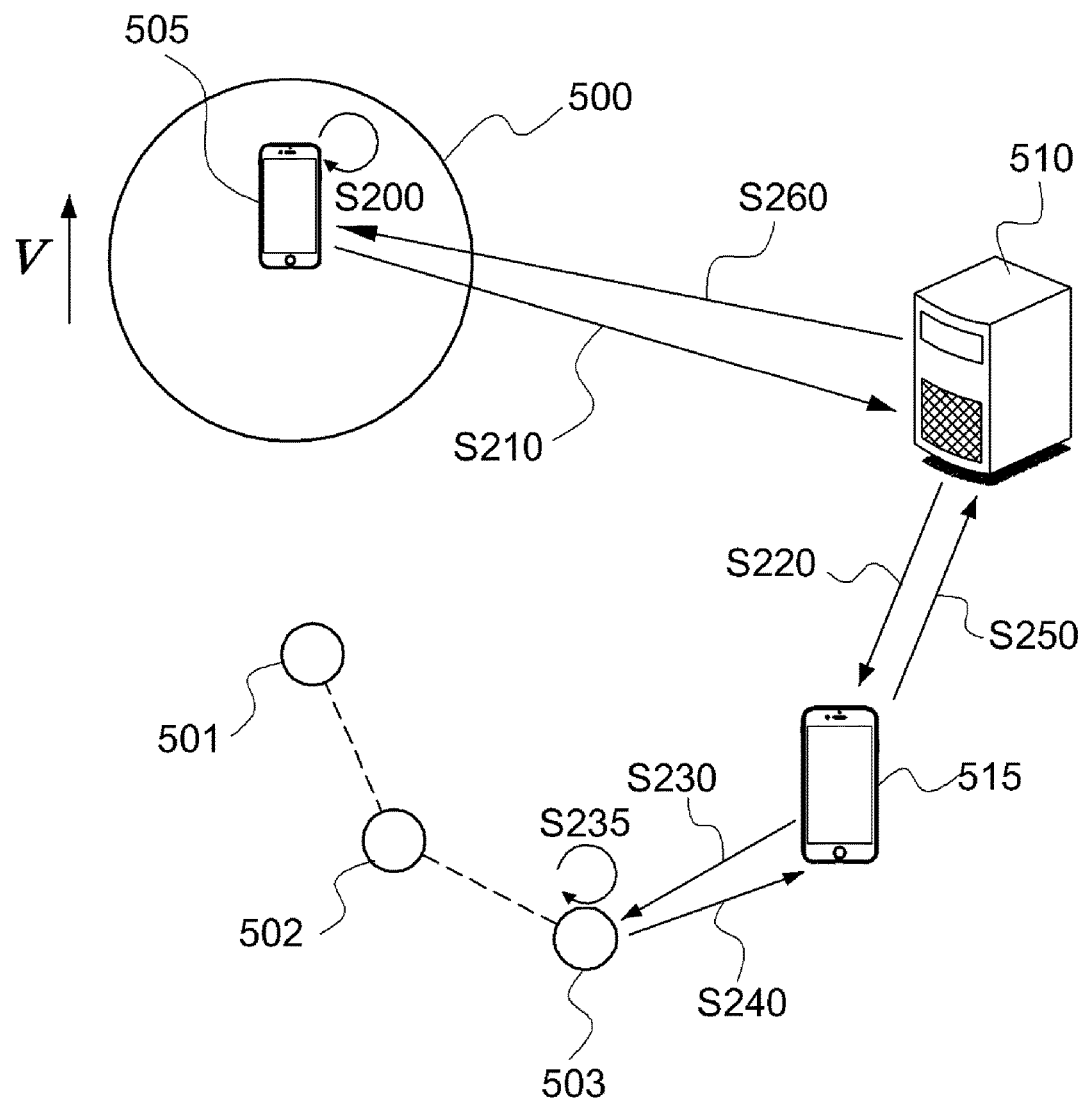
FIG. 10 illustrates a process configuration example as a scenario where portable objects 501, 502, 503 are stationary and a smartphone 505 is in movement with velocity V according to an example embodiment.
Figure 11:
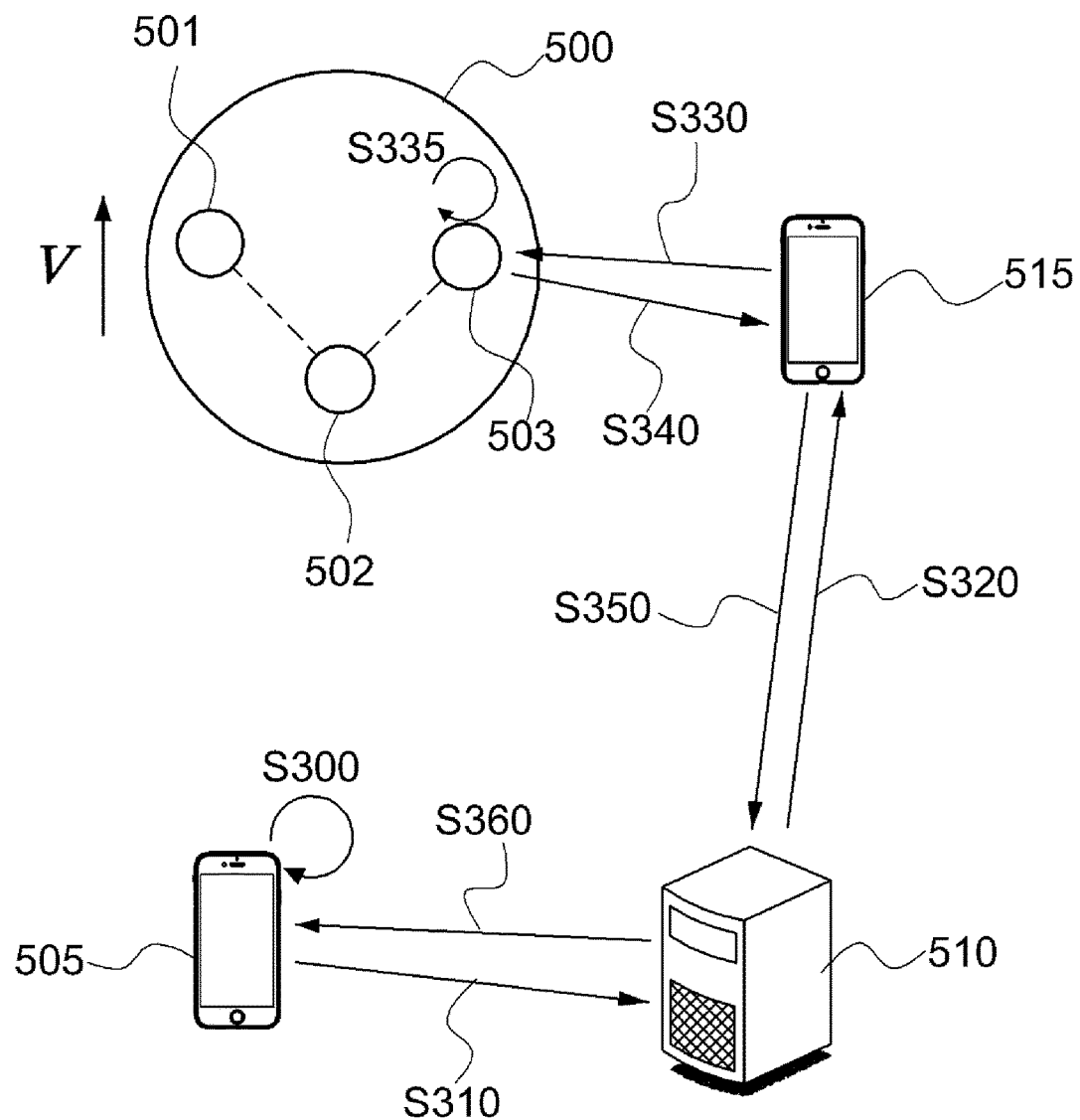
FIG. 11 also shows a process configuration example as another scenario where a smartphone 505 is stationary and portable objects 501, 502, 503 are moving in movement with velocity V according to an example embodiment.

Among various scenarios of this disclosure like the aforementioned, FIGS. 9-11 illustrate an internal communication inside a cluster network and a communication process with a detection server 510 about mobility between a CHD and an SCD.

FIG. 9 shows a cluster network 500 with a moving speed V. In the cluster network, three SCDs 501, 502, and 503 are located inside of it. And each SCD is considered as a portable object. A CHD 505 is a user's smartphone. A user who owns a smartphone and portable objects may move in a moving speed V or remain stationary. Like FIG. 9, if a user moves with a smartphone and portable objects, a speed of the CHD 505 and the SCD 501, 502, and 503 in the cluster network 500 is identical, or the separated distance is not changed. However, when the user moves with a smartphone somewhere while one of the portable objects is left behind, it can be considered as a an occurrence of a singularity at the corresponding cluster network 500.

And it is important to execute the following processes by precisely recognizing the singularity. FIG. 10 illustrates an embodiment of the situation wherein the singularity is occurred by separating CHD 505 from SCD 501, 502, and 503. The CHD 505 is moving with a speed V while SCD 501, 502, 503 are stationary. When the CHD 505 and more than one SCD are separated over the previously determined limit distance, the user can decide whether the corresponding portable object is in danger of a loss/theft or not.

A CHD 505 executes an event of a loss/theft's verification by popping up alert messages or generating alert sounds by an application software (S200). If the loss/theft verification is true, then the CHD 505 notifies of a loss/theft fact by sending a message of a loss/theft occurrence (S210) to a detection server 515. A previously registered family device, i.e., an adjacent CHD 515, by the detection server 510 is requested for a mutual search (S220). Then the adjacent CHD 515 searches for the corresponding SCD by using SCD information of a previously registered portable object (S230). If the corresponding SCD is to be searched in an S230 phase, the searched SCD information is transferred to an adjacent CHD 515 (S240), and subsequently the corresponding CHD 515 sends a fact of a search verification to the detection server 510 (S250), and the detection server 510 which received the fact of a search verification sends a message that verifies the existence of the portable objects to the CHD 505 (S260).

FIG. 11 illustrates another embodiment of this disclosure. Unlike an embodiment of FIG. 10, a CHD 505 is stationary or SCD 501, 502, 503 are in movement with a speed V. In the same way, if the CHD 505 and at least one SCD are separated above the previously determined limit distance, a user can determine by a portable object SCD whether a smartphone is in a loss/theft risk or not.

In FIGS. 10 and 11, for a fast search, a method to find an SCD adjacent to a family device has been proposed, wherein a CHD 505 that has determined the verification of an SCD's loss/theft requests a search for all of the family devices 515 that are registered by a detection server 510 (S200, S300).

On the other hand, an SCD's application that determines the verification of a CHD's loss/theft generates an alert like alert messages, vibrations, alert sounds and/or alert lights and others, and it is possible to extend a search method (S235, S335) in the similar way for an adjacent family device 515.

Figure 12:
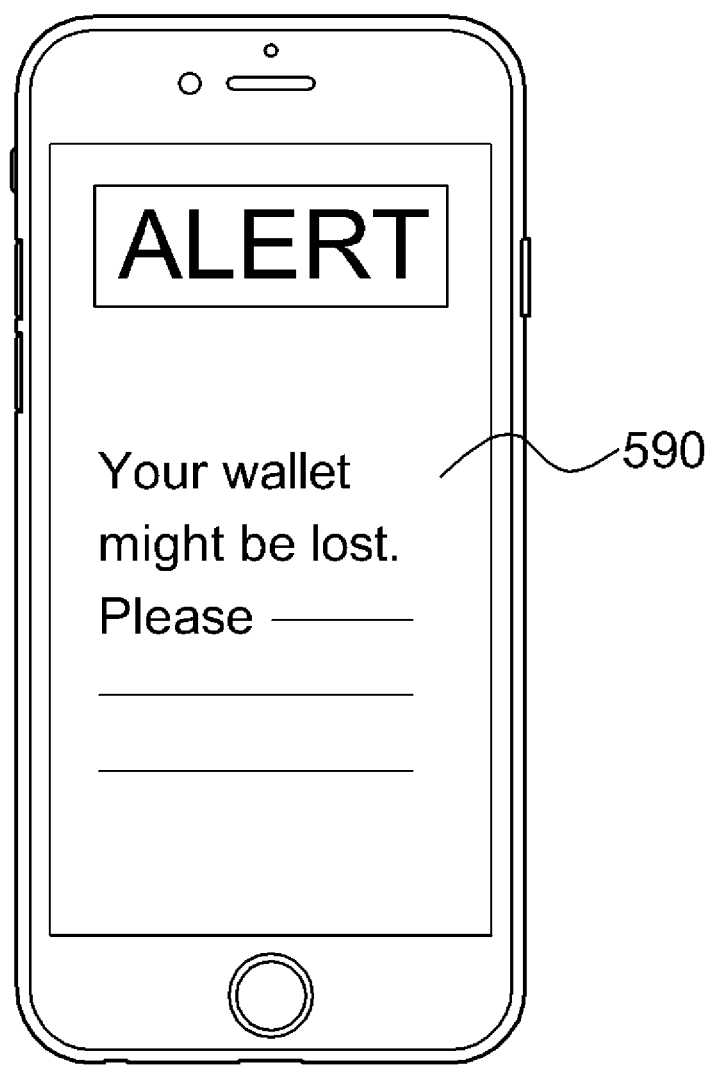
FIG. 12 displays an example of an application screen of CHD that provides alerts to loss of portable objects in accordance with an example embodiment.

The aforementioned S200-S260 phases of FIG. 10 correspond to S300-S360 ones in FIG. 11. FIG. 12 shows an example of an application screen of a CHD 505 that executes an event of loss/theft verification in S200 and S300 phases. An alert message displays a possibility by a smartphone's screen 590 whereas a wallet may be in a loss/theft situation.

By the aforementioned detailed explanations, the experts of this area can understand well the features of anti-loss/anti-theft supporting methods and the possibility of various modifications. At present, a schematic total process of the methods of this invention by referring to FIG. 2 is explained again by summarization.

On the other hand, an anti-loss/anti-theft supporting method by this invention can be implemented by a form of program instructions that are to be executed by various computer means, thereby being recorded in a form of media that is capable of being read out by a computer. The media capable of being read out by a computer can be included as a standalone or a combination of program instructions, data files, data structures, and more, etc. The program instructions recorded in the media are specially designed and organized for this invention or they are publicly available releases for computer software professionals. An example of recorded media capable of being read out by a computer contains a magnetic medium like a hard disk, a floppy disk, and a magnetic tape, an optical medium like a Compact Disk-Read Only Memory (CD-ROM), and Digital Versatile Disk (DVD), a magneto-optical medium like a floptical disk, and a specially organized hardware device which stores program instructions and executes it, like a ROM, a Random Access Memory (RAM), a flash memory, etc. The media can be a form of transmission media like optical fibers or metal wires, waveguides, and etc., including a carrier wave for transmitting signals that are designated as program instructions, data structures, etc. An example of program instructions contains both of machine language code generated by a compiler and high-level language code that is to be executed by an interpreter and etc. The hardware device can be configured to run as at least one software module to perform operations of this disclosure, and as well as the software module and vice versa.

The devices, servers, smartphones, networks, etc. described herein may be configured to perform operations using any suitable combination of hardware and software. For example, the small communication device, cluster head device and detection server may each include any suitable circuitry, logic gates, microprocessor(s), computer-executable instructions stored in memory, etc. operable to cause the small communication device, cluster head device and/or detection server to perform actions described herein (e.g., registration, mutual monitoring, etc.). In some embodiments, each of the small communication devices, cluster head devices, detection servers, etc. may comprise a specific device, a computer, software running on a device, etc.

In this invention, although it is not specially mentioned, the methods of this invention can be applicable to various anti-loss/anti-theft supporting technologies and network monitoring ones. If technical tasks of this invention are chosen and its resolving principle is determined, such technologies can be applicable and adaptable, suitably for the task and the principle.

A protection scope of this disclosure is not restricted by the presentations of explicitly explained examples of embodiments.

What is claimed is:

1. A portable object detection system, the system comprising:
    a portable object;
    at least one small communication device (SCD) coupled with the portable object, the at least one SCD configured to determine a location of the SCD;
    a first cluster network including a first cluster head device (CHD), the first CHD comprising a smartphone, the first CHD configured to register the SCD prior to monitoring, and to execute mutual monitoring between the SCD and the first CHD;
    a detection server; and
    a second cluster network including a second CHD configured to register information about the SCD in the first cluster network prior to monitoring, wherein the second CHD comprises a family device registered prior to monitoring at the detection server through a request of the first CHD or the SCD in the first cluster network;
    wherein the detection server is configured to request monitoring of the SCD as a lost target in the first cluster network by the second CHD when a loss event is received from the first CHD in the first cluster network, the first CHD is configured to transmit the loss event in response to a detected separation distance of the SCD from the first CHD exceeding a previously determined limit distance, the first CHD and the second CHD are managed at an adjustable message transmission interval sent from the first CHD to the SCD, and the adjustable message transmission interval sent from the first CHD to the SCD is modified by at least one of a local timestamp, a next wakeup timestamp, a sync timestamp, a location information, a mobility, and a power capacity of the SCD and the first CHD as collected by the mutual monitoring.

2. The portable object detection system of claim 1, wherein:
    a radio transmission power sent from the first CHD to the SCD is adjustable and a radio transmission power sent from the SCD to the first CHD is adjustable, and the adjustable radio transmission power sent from the first CHD to the SCD and the adjustable radio transmission power sent from the SCD to the first CHD are modified by at least one of the local timestamp, the next wakeup timestamp, the sync timestamp, the location information, the mobility, and the power capacity of the SCD and the first CHD as collected by the mutual monitoring.

3. The portable object detection system of claim 1, wherein when the first CHD in the first cluster network detects a possibility of a loss for the SCD, a radio transmission power for transmitting a push message in the first cluster network is adjusted.

4. The portable object detection system of claim 1, wherein when the SCD in the first cluster network detects a possibility of a loss for the CHD, a radio transmission power for transmitting a pull message in the first cluster network is adjusted.

5. The portable object detection system of claim 1, wherein: during the execution of the mutual monitoring, the SCD belonging to the first cluster network or an SCD belonging to the second cluster network is configured to search for the first CHD or the second CHD when a loss event for the first CHD or the second CHD has occurred.

6. A portable object detection method, the method comprising:
    configuring a first cluster network by registering, at a detection server prior to monitoring, device information about a portable object coupled with at least one small communication device (SCD), and a first cluster head device (CHD), the first CHD comprising a smartphone, the at least one SCD configured to determine a location of the SCD;
    transferring, by the detection server, information about the SCD and/or the first CHD in the first cluster network to a second CHD in a second cluster network, the first CHD and/or the SCD registering, prior to monitoring, the second CHD in the second cluster network as a family device, the second CHD previously registered at the detection server;
    performing mutual monitoring between the SCD and the first CHD in the first cluster network by transmitting a message from the first CHD to the SCD and a message from the SCD to the first CHD, adjusting a transmission interval of the messages, and collecting a local timestamp, a next wakeup timestamp, a sync timestamp, a location information, a mobility, and a power capacity of the SCD and the first CHD; and
    requesting, by the second CHD in the second cluster network, mutual monitoring for the first CHD and/or the SCD as a lost target of the first cluster network, when the detection server receives a loss event from the first CHD and/or the SCD in the first cluster network, wherein the first CHD and/or the SCD is configured to transmit the loss event in response to a detected separation distance of the SCD from the first CHD exceeding a previously determined limit distance.

7. The portable object detection method of claim 6, further comprising:
    adjusting a radio transmission power between the first CHD and the SCD.

* * * * *